US007811062B1

(12) United States Patent
Twigg

(10) Patent No.: US 7,811,062 B1
(45) Date of Patent: Oct. 12, 2010

(54) FIBER REINFORCED METAL ROTOR

(75) Inventor: Edwin S Twigg, Derby (GB)

(73) Assignee: Rolls-Royce PLC, London (GB)

( * ) Notice: Subject to any disclaimer, the term of this patent is extended or adjusted under 35 U.S.C. 154(b) by 1826 days.

(21) Appl. No.: 09/084,263

(22) Filed: Jun. 3, 1998

(30) Foreign Application Priority Data

Jun. 3, 1997 (GB) ................................ 9711768.3
Jun. 5, 1997 (GB) ................................ 9711771.7

(51) Int. Cl.
*B64C 11/26* (2006.01)

(52) U.S. Cl. ................................ 416/218

(58) Field of Classification Search ............ 416/214 R, 416/215, 218, 220 R, 221
See application file for complete search history.

(56) References Cited

U.S. PATENT DOCUMENTS 3,554,667 A * 1/1971 Wagle ........................ 416/217
3,554,668 A * 1/1971 Wagle .................... 416/220 R
3,610,777 A * 10/1971 Wagle ........................ 416/198
3,625,634 A * 12/1971 Stedfeld ..................... 416/198
3,813,185 A * 5/1974 Bouiller et al. ............. 416/198
4,011,295 A 3/1977 Tree et al.
4,076,456 A 2/1978 Tree et al.
4,334,827 A 6/1982 Bouiller et al. ............. 416/218
4,339,229 A * 7/1982 Rossman .................... 416/218
4,432,697 A 2/1984 Miura et al. ................ 416/215
4,826,645 A 5/1989 Angus
4,867,644 A 9/1989 Wright et al.
5,030,277 A 7/1991 Eylon et al.
5,464,325 A * 11/1995 Albring et al. .............. 416/185
5,470,524 A 11/1995 Krueger et al. ................. 419/5
5,660,526 A * 8/1997 Ress, Jr. ..................... 416/218
5,946,801 A 9/1999 Twigg et al.

FOREIGN PATENT DOCUMENTS

DE 2027861 * 12/1971 ................ 416/218
EP 0 629 770 A 12/1994
EP 0747573 12/1996
EP 0831154 A1 3/1998
FR 1 040 697 A 10/1953
FR 2 335 701 A 7/1977
FR 2347858 * 11/1977 ................ 416/218
FR 2 567 052 A 1/1986
GB 394495 * 6/1933 ................ 416/218
GB 1252544 A 11/1971
GB 2084664 A 4/1982
GB 2161108 A 1/1986
GB 2161109 A 1/1986
GB 2161110 A 1/1986
GB 2247492 A 3/1992

* cited by examiner

*Primary Examiner*—Stephen M Johnson
(74) *Attorney, Agent, or Firm*—Oliff & Berridge, PLC

(57) ABSTRACT

A fiber reinforced metal compressor disc includes a hub, a rim and a diaphragm extending radially between the hub and the rim. The fiber reinforced metal compressor disc comprises a first ring of ceramic fibers and a second ring of ceramic fibers. The first ring of fibers is arranged in the hub and the second ring of fibers is arranged in the rim of the disc. The rim of the disc carries a plurality of blades. This arrangement of the rings of fibers minimizes the weight of the disc, especially for large radius discs suitable for carrying large blades and operating at high rotational speeds.

21 Claims, 4 Drawing Sheets

PRIOR ART

FIBER REINFORCED METAL ROTOR

BACKGROUND OF THE INVENTION

The present invention relates to a fiber reinforced metal rotor. The present invention relates particularly to fiber reinforced metal discs and fiber reinforced metal rings which are suitable for use in gas turbine engines as blade carrying compressor, or turbine, rotors. The present invention is particularly suitable for applications where the fiber reinforced metal rotor has a large diameter and is intended to rotate at high speeds.

DESCRIPTION OF THE RELATED ART

A conventional compressor rotor for a gas turbine engine comprises a solid unreinforced metal disc which has a relatively large hub, a relatively large rim and a relatively thin diaphragm which extends between the hub and the rim. The rim carries compressor blades which extend radially from the rim. The compressor blades may be integral with the rim or the compressor blades may have roots which are arranged to locate in axially or circumferentially extending grooves in the rim. The compressor blades which are integral with the rim may be friction welded to the rim or may be machined from the forged disc.

It is known to provide a compressor rotor for a gas turbine engine which comprises a solid fiber reinforced metal ring, for example as in UK Patent GB2247492. The ring carries compressor blades which extend radially from the ring. The compressor blades may be integral with the ring or the compressor blades may have roots which are arranged to locate in axially or circumferentially extending grooves in the ring. The compressor blades which are integral with the ring may be friction welded to the ring or may be machined from the ring. This solid fiber reinforced compressor rotor does not have a diaphragm and hub as in the conventional solid metal compressor disc.

It is important in gas turbine engines used on aircraft to minimize the weight of the gas turbine engine. It is also necessary to increase the thrust of gas turbine engines, and this has necessitated an increase in the size of the gas turbine engine. It has been found that the use of solid fiber reinforced metal rings, about 0.5 meter outer radius, designed to operate at a rotational speed of about 11000 revolutions per minute (rpm) and carrying large, heavy, blades are about 10 percent heavier than a conventional solid metal disc. This is because the fiber reinforced metal ring has to be made massive enough to carry the loads of the blades.

SUMMARY OF THE INVENTION

The present invention seeks to provide a solid fiber reinforced metal rotor which has reduced weight compared to the known solid fiber reinforced metal ring and known solid metal disc.

Accordingly the invention provides a fiber reinforced metal rotor comprising a hub, a rim and a member extending radially between and interconnecting the hub and the rim, the fiber reinforced metal disc having an axis of rotation, the fiber reinforced metal rotor having at least two rings of fibers arranged integrally within the fiber reinforced metal rotor, a first ring of fibers being arranged substantially at a first radial distance from the axis of rotation, a second ring of fibers being arranged substantially at a second radial distance from the axis of rotation and the second radial distance is greater than the first radial distance, the first ring of fibers being arranged in the hub of the fiber reinforced metal rotor.

Preferably the second ring of fibers is arranged in the rim.

The fiber reinforced metal rotor may comprise titanium, titanium aluminide, an alloy of titanium, or any suitable metal, alloy or intermetallic which is capable of being bonded.

The reinforcing fibers may be silicon carbide, silicon nitride, boron, alumina or other suitable fibers.

The fiber reinforced metal rotor may have at least one rotor blade. The at least one rotor blade may be integral with the fiber reinforced metal rotor. The at least one rotor blade may have a root arranged to fit in at least one axially, or circumferentially, extending groove in the fiber reinforced metal rotor.

The fiber reinforced metal rotor has an outer radius, the outer radius is at least about 0.5 meters.

BRIEF DESCRIPTION OF THE DRAWINGS

The present invention will be more fully described by way of example with reference to the accompanying drawings, in which.

DETAILED DESCRIPTION OF PREFERRED EMBODIMENTS

Figure 1:
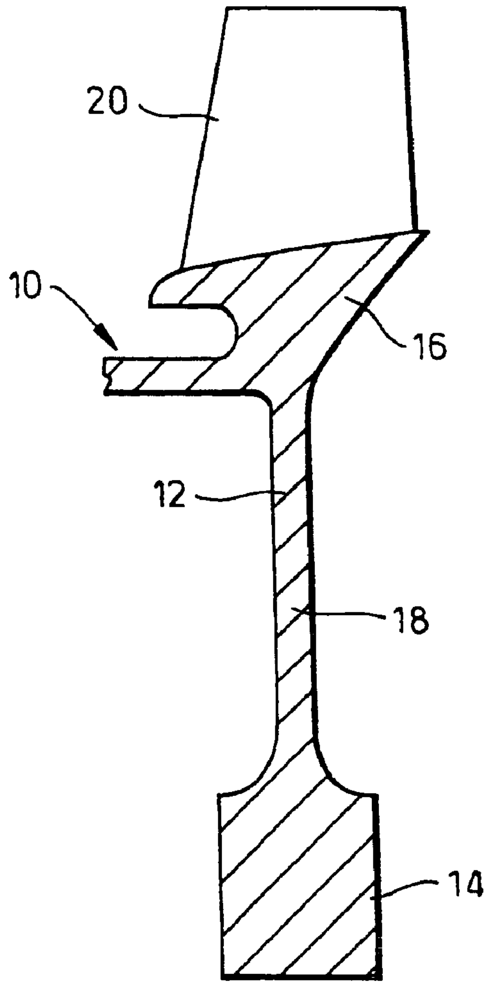
FIG. 1 is a cross-sectional view through conventional solid unreinforced metal rotor.

A conventional compressor rotor 10, as shown in FIG. 1, for a gas turbine engine comprises a solid unreinforced metal disc 12 which has a relatively large hub 14, a relatively large rim 16 and a relatively thin diaphragm 18 which extends between and interconnects the hub 14 and the rim 16. The rim 16 carries compressor rotor blades 20 which extend radially from the rim 16. The compressor rotor blades 20 may be integral with the rim 16 or the compressor rotor blades 20 may have roots which are arranged to locate in axially or circumferentially extending grooves, not shown, in the rim 16. The compressor rotor blades 20 which are integral with the 16 may be friction welded to the rim 16 or may be machined from the forged disc.

Figure 2:
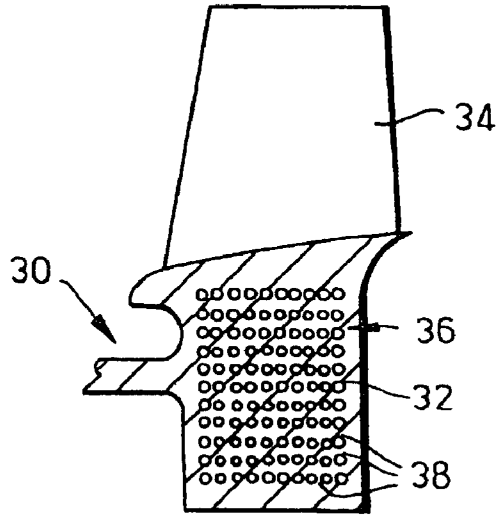
PRIOR ART Fig.2.
FIG. 2 is a cross-sectional view through a known fiber reinforced metal rotor.

Another known compressor rotor 30, as shown in FIG. 2, for a gas turbine engine comprises a ceramic fiber reinforced metal ring 32. The ring 32 carries compressor rotor blades 34 which extend radially from the ring 32. The ring 32 comprises a ring of fibers 36, the individual ceramic fibers 38 extending circumferentially through 360 degrees. The compressor rotor blades 34 may be integral with the ring 32 or the compressor rotor blades 34 may have roots which are arranged to locate in axially or circumferentially extending grooves in the ring 32. The compressor blades which are integral with the ring 32 may be friction welded to the ring 32 or may be machined from the ring 32.

It is to be noted that the ceramic fiber reinforced compressor rotor 30 does not have a diaphragm and hub as in the conventional solid metal compressor disc 10. The ring of fibers 38 increases the hoop strength of the ring 32 and the ceramic fibers 38 reduce the density of the ring 32. The volume fraction of fibers in the ring of fibers 38 is about 30 percent.

As an example a ceramic fiber reinforced compressor rotor 30 with an outer radius of 0.5 meters, or greater, carrying large, heavy, compressor blades and arranged to operate at about 11000 revolutions per minute (rpm) is heavier than a conventional solid metal compressor rotor 10 with the same diameter. This is because the free ring radius, the radius beyond which the material of the rotor is not load bearing, decreases with increasing speed of rotation. The free ring radius for a ceramic fiber reinforced ring 32 operating at 11000 rpm is very close to the outer radius of the ceramic fiber reinforced ring 32. Therefore the ceramic fiber reinforced metal ring 32 has to be more massive to carry the loads of the compressor blades 34. The introduction of the ceramic fibers 38 reduces the density of the ring 32, but does not reduce the weight of the ring 32 to less than that of the ring 10, because the mass of the ring 32 is concentrated substantially at the radius of attachment of the blades 34 to the ring 32.

However, the free ring radius decreases with increasing speed and decreases with increasing blade loading. The free ring radius is also dependent upon the metal and the fibers. The free ring radius for a fiber reinforced metal is greater than that for an unreinforced metal. Thus a ceramic fiber reinforced compressor rotor 32 with an outer diameter less than 0.5 meters may be heavier than a conventional solid metal compressor rotor 10, of the same diameter, if the speed of rotation and or blade loads are sufficiently high.

Figure 3:
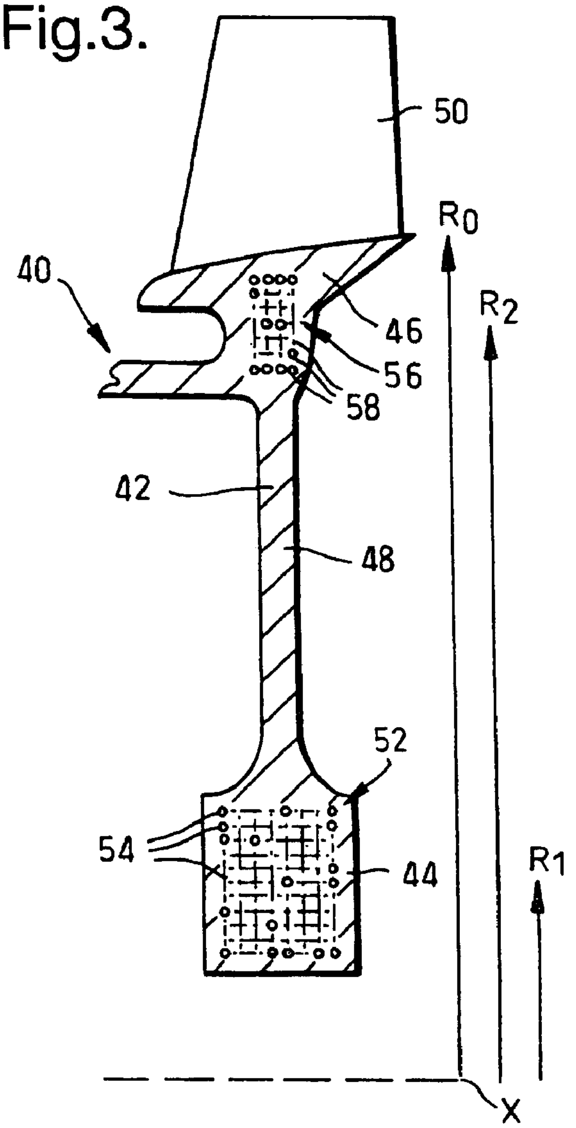
FIG. 3 is a cross-sectional view through a fiber reinforced metal rotor according to the present invention.

A compressor rotor 40 according to the present invention, as shown in FIG. 3, for a gas turbine engine comprises a ceramic fiber reinforced metal disc 42 which has a relatively large hub 44, a relatively large rim 46 and a relatively thin diaphragm 48 which extends between and interconnects the hub 44 and the rim 46. The rim 46 carries compressor rotor blades 50 which extend radially from the rim 46. The compressor rotor blades 50 may be integral with the rim 46 or the compressor rotor blades 50 may have roots which are arranged to locate in axially or circumferentially extending grooves, not shown, in the rim 46. The compressor rotor blades 50 which are integral with the rim 46 may be friction welded to the rim 46 or may be machined from the disc 42.

The disc 42 comprises a first ring of fibers 52, the individual ceramic fibers 54 extending circumferentially through 360 degrees. The first ring of fibers 52 is arranged substantially at a first radial distance $R_1$ from the axis of rotation X of the disc 42 and the first ring of fibers 52 is coaxial with the axis of rotation X. The disc 42 comprises a second ring of fibers 56, the individual ceramic fibers 58 extending circumferentially through 360 degrees. The second ring of fibers 56 is arranged substantially at a second radial distance $R_2$ from the axis of rotation X and the second ring of fibers 56 is coaxial with the axis of rotation X. The second radial distance $R_2$ is greater than the first radial distance $R_1$. In this example the first ring of fibers 52 is arranged in the hub 44 of the disc 42 and the second ring of fibers 56 is arranged in the rim 46 of the disc 42. The volume fraction of fibers in the rings of fibers 52 and is about 30 percent, but other volume fractions may be used.

The second ring of fibers 56 is introduced into the rim 46 of the disc 42 to reduce the density of the rim 44 and hence its weight, but the second ring of fibers 56 is designed to be insufficient on its own to carry the load of the compressor rotor blades 50. The second ring of fibers 56 also reduces the load carrying requirement of the hub 44 of the disc 42 and thus enables the hub 44 to be made smaller. The first ring of fibers 52 is introduced into the hub 44 of the disc 42 to carry the loads on the compressor rotor blades 50 and reduces the density of the hub 44 and hence its weight. The result of using the ceramic fiber reinforcement at the hub 44 and rim 46 of the disc 42 is that both the hub and the rim 46 of the disc are reduced in size, density and weight compared to the conventional solid metal disc.

As an example a ceramic fiber reinforced titanium disc with an outer radius of about 0.5 meters or greater, carrying large, heavy, compressor blades and arranged to operate at about 11000 revolutions per minute (rpm) has a 26 percent reduction in weight compared to the conventional solid titanium metal disc 12, and a 34 percent reduction in weight compared to a ceramic fiber reinforced titanium ring 32.

However, because the free ring radius decreases with increasing speed and decreases with increasing blade loading the ceramic fiber reinforced compressor rotor 40 with a smaller outer diameter than 0.5 meters may be lighter than a conventional solid metal compressor rotor 10, of the same diameter, if the speed of rotation and or blade loads are sufficiently high.

Figure 4:
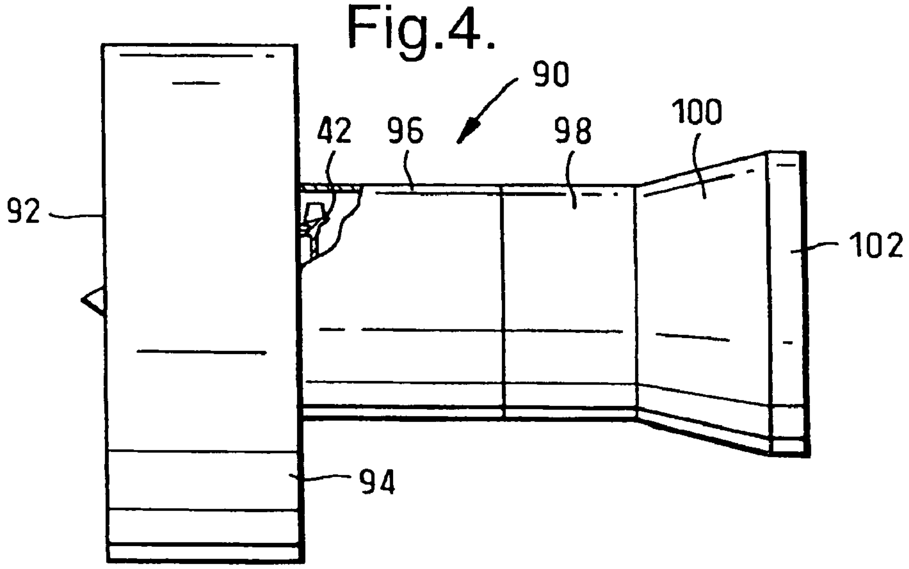
FIG. 4 is a cross-sectional view through a gas turbine engine showing a fiber reinforced titanium compressor rotor.

A turbofan gas turbine engine 90, as shown in FIG. 4, comprises in axial flow series an inlet 92 a fan section 94, a compressor section 96, a combustion section 98, a turbine section 100 and an exhaust 102. The compressor section comprises one or more fiber reinforced discs 42 as described with reference to FIG. 3.

Figure 5:
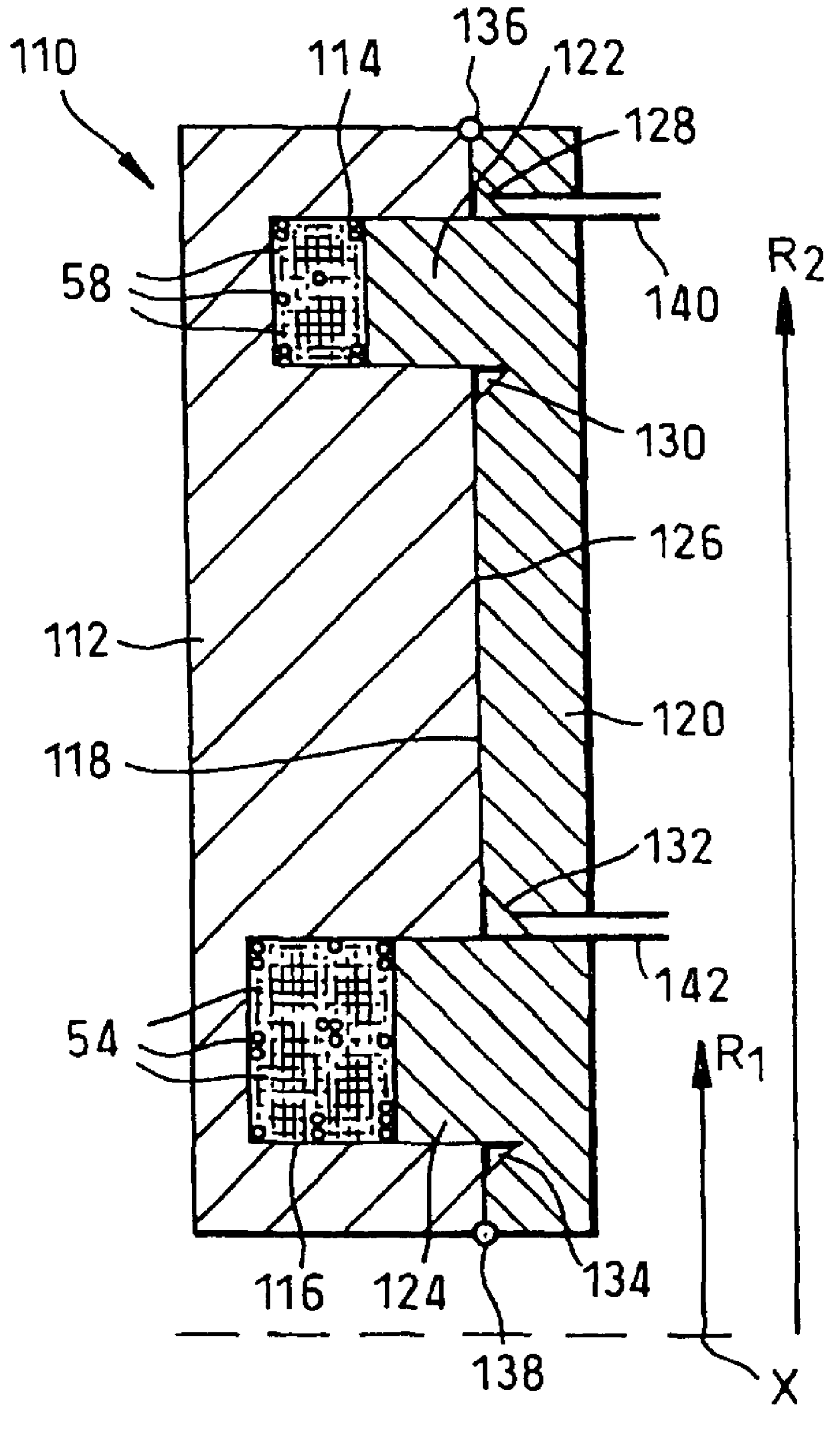
FIG. 5 is a cross-sectional view through a preform used to make a fiber reinforced metal rotor as shown in FIG. 3.

A fiber reinforced metal rotor 42 as shown in FIG. 3 is manufactured using preforms as shown in FIG. 5. A first metal ring 112, or metal disc, is formed and a first annular axially extending groove 114 and a second annular axially extending groove 116 are machined in one axial face 118 of the first metal ring 112. The first and second annular grooves 114 and 116 are arranged at radial distances of $R_1$ and $R_2$ respectively from the axis X of the metal ring 112. The annular grooves 114 and 116 have parallel straight sides which form a rectangular cross-section. A second metal ring 120, or metal disc, is formed and a first annular axially extending projection 122 and a second annular axially extending projection 124 are machined from the second metal ring 120 such they extend from one axial face 126 of the second metal ring 120. The second metal ring 120 is also machined to form four annular grooves 128, 130, 132 and 134 in the face 126 of the second metal ring 120. The grooves 128 and 130 are arranged radially on either side of the first annular projection 122 and the grooves 132 and 134 are arranged radially on either side of the second annular projection 124. The grooves 128, 130, 132 and 134 taper from the axial face 126 to the bases of the annular projections 122 and 124.

Circumferentially extending fibers 56 and 54 are arranged in the first and second annular grooves 114 and 116 respectively. The fibers 54 and 56 may be one or more annular fiber preforms, each annular fiber preform comprising a metal coated fiber which is wound into a planar spiral. A sufficient number of fibers, or annular fiber preforms, are stacked in the annular grooves 114 and 116 to partially fill the annular grooves 114 and 116 to predetermined levels.

The second metal ring 120 is then arranged such that the axial face 126 confronts the axial face 118 of the first metal ring 112, and the axes of the first and second metal rings 112 and 120 are aligned such that the first and second annular projections 122 and 124 on the second metal ring align with the first and second annular grooves 114 and 116 respectively of the first metal ring 112. The second metal ring 120 is then pushed towards the first metal ring 112 such that the first annular projection 122 enters the first annular groove 114 and the second annular projection 124 enters the second annular groove 116. The second metal ring 120 is further pushed until the axial face 126 of the second metal ring 120 abuts the axial face 118 of the first metal ring 112. The grooves 128, 130, 132 and 134 then form annular chambers between the confronting faces 118 and 126 of the first and second metal rings 112 and 120.

The radially inner and outer peripheries of the axial face 118 of the first metal ring 112 are sealed to the radially inner and outer peripheries respectively of the axial face 126 of the second metal ring 120 to form a sealed assembly. The sealing is performed by TIG welding, electron beam welding, laser welding or other suitable welding process to form outer and inner weld seals 136 and 138 respectively.

The second metal ring is provided with pipes 140 and 142 which extend through holes in the second metal ring 120 and which interconnect to the annular grooves 128 and 132 respectively. The annular projections 122 and 124 are provided with axially extending slots.

The pipes 140 and 142 are connected to vacuum pumps and the sealed assembly is evacuated. The sealed assembly is heated to evaporate any glue used to hold the fiber preforms in place, and the evaporated glue passes along the slots on the annular projection 122 and 124 into the annular grooves 128 and 132 and through the pipes 140 and 142. The annular projections prevents movement of the metal coated fibers once the glue has been removed.

The sealed assembly is then heated to diffusion bonding temperature and isostatic pressure is applied to the sealed assembly, this is known as hot isostatic pressing, and this results in axial consolidation of the fibers and diffusion bonding of the first metal ring 112 to the second metal ring 120 and diffusion bonding of the metal on the metal coated fibers to the metal on other fibers and to the first and second metal rings 112 and 120. Following hot isostatic pressing the resulting consolidated and diffusion bonded fiber reinforced metal component is machined to produce the shape of the fiber reinforced metal disc 42. This may involve machining blades from the component, or friction welding blades onto the component or machining axially or circumferentially extending slots to receive blade roots.

It is to be noted that the ceramic fibers are integrally formed into the disc by the consolidation and diffusion bonding process.

This method of manufacture is disclosed more fully in our UK patent application No. 9619890.8 filed 24 Sep. 1996, and this should be consulted for more details.

Figure 6:
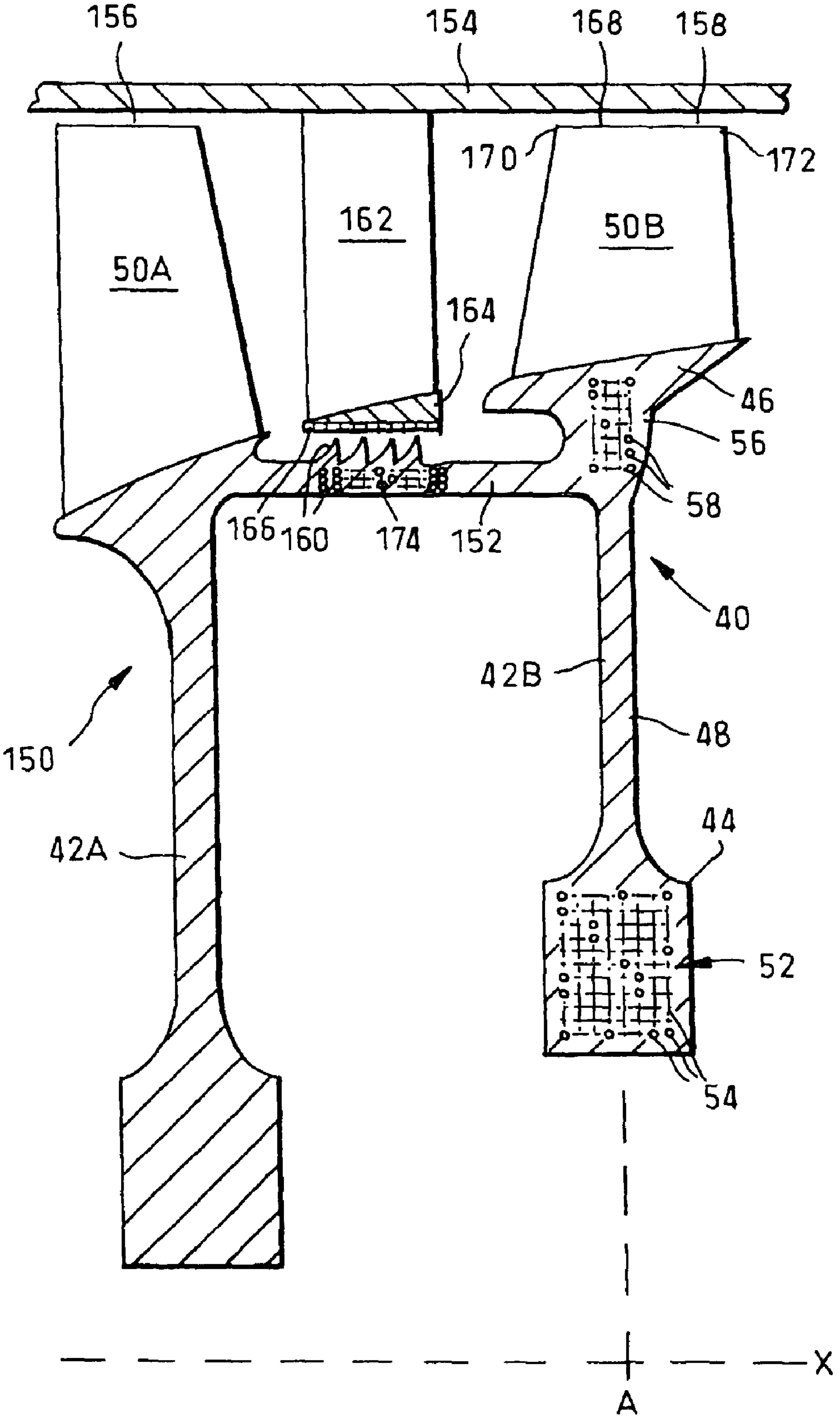
FIG. 6 is a cross-sectional view through an alternative fiber reinforced metal rotor according to the present invention.

A compressor rotor 150 according to the present invention, as shown in FIG. 6, comprises a plurality of compressor discs, in this example a first, upstream, compressor disc 42A and a second, downstream, compressor disc 42B. The compressor discs 42A and 42B are spaced apart by an annular spacer 152 which extends axially between and is secured to the compressor discs 42A and 42B. The rim of the compressor disc 42A carries a plurality of equi-circumferentially spaced radially extending compressor rotor blades 50A. The rim of the compressor disc 42B carries a plurality of equi-circumferentially spaced radially extending compressor rotor blades 50B. The compressor rotor blades 50A and 50B may be integral with the rim 46 or the compressor blades may have roots which are arranged to locate in axially or circumferentially extending grooves, not show, in the rim 46 of the compressor discs 42A and 42B. The compressor rotor blades 50A and 50B which are integral with the rim 46 may be friction welded to the rim or may be machined from the forged disc.

The compressor discs 42A and 42B and the compressor rotor blades 50A and 50B are designed to lie in radial planes A relative to the axis of rotation x of the compressor rotor 40.

A compressor casing 154 surrounds the compressor rotor 150 and the compressor casing 154 is spaced radially from the tips of the compressor rotor blades 50A and 50B by clearances 156 and 158 respectively. The annular spacer 152 has a plurality of circumferentially and radially extending ribs 160. The compressor casing 154 carries a plurality of stator vane assemblies, only one stator vane assembly is shown. Each stator vane assembly comprises a plurality of equi-circumferentially spaced stator vanes 162 and the radially inner shrouds 164 of the stator vanes 162 cooperate with the ribs 160 on the annular spacer 152 to form a labyrinth seal. The ribs 160 are spaced from the inner shrouds 164 by a clearance 166. The inner shrouds 164 usually comprise a honeycomb or abradable material which is in proximity to the ribs 160.

The annular spacer 152 has a ring of fibers 174 to reinforce the annular spacer 152. The fibers are ceramic fibers and extend circumferentially through 360°. This results in an increase in the stiffness of the annular spacer 152. The stiffness of the annular spacer 152 is controlled by the amount of reinforcing fibers in the ring of fibers 174, the size and the position of the ring of fibers 174 within the annular spacer 152. The ring of fibers 174 is selected to minimise the amount of radial movement, or radial bowing, of the annular spacer 152 relative to the compressor discs 42A and 42B in operation, and preferably the ring of fibers 174 is selected such that there is no radial movement of the annular spacer 152 relative to the compressor discs 42A and 42B. This is achieved by selecting the ring of fibers 174 so that the radial movement of the annular spacer 152 matches the radial movement of the compressor discs 42A and 42B.

In operation the annular spacer 152 minimises the amount of movement of the radially outer tips 168 of the compressor blades 50B in a radially downstream direction relative to the radially inner ends of the compressor blades 50B. This minimises the movement of the leading edges 170 of the radially outer tips 168 of the compressor blades 50B radially outwardly and minimises the movement of the trailing edges 172 of the radially outer tips 168 of the compressor blades 50B radially inwardly. This minimises the possibility of rubbing between the leading edges of the radially outer tips 168 of the compressor blades 50B and the compressor casing 154 particularly at high operating speeds, and hence minimises the possibility of forming trenches and hence maintains the clearance 158 closer to the designed clearance. Thus the efficiency of the compressor and hence the efficiency of the gas turbine engine is maintained.

Also the spacer 152 minimises the amount of radial movement of the ribs 160 on the annular spacer 152 relative to the inner shrouds 164 of the stator vanes 162. This minimises the possibility of rubbing between the ribs 160 and the inner shrouds 164 of the stator vanes 162 particularly at high operating speeds, and hence minimises the possibility of wearing trenches in the honeycomb or abradable material or wearing the ribs 160. Furthermore this maintains the clearance 166 closer to the designed clearance and thus the efficiency of the compressor and hence the efficiency of the gas turbine engine is maintaned.

Additionally fouling between the trailing edges 172 of the compressor blades 50B and an adjacent stage of stator vanes is prevented. Furthermore, the use of the ring of fibers 174 in the annular spacer 152 results in the compressor discs 42A and 42B having reduced weight because the discs do not require additional material to give some radial movement control to the annular spacer 152.

In this example the first upstream, compressor disc 42A is a solid metal disc, but the second compressor disc 42B is a fiber reinforced metal disc and comprises a first ring of fibers 74 and a second ring of fibers 76. The first ring of fibers 74 is arranged at a first radial distance from the axis of rotation x in the hub 78 of the disc 44 and the second ring of fibers 76 is arranged at a second radial distance from the axis of rotation x in the rim 80 of the disc 44. The hub 78 and rim 80 are interconnected by a diaphragm 82. The first and second rings of fibers 74 and 76 minimise the weight of the compressor disc 44. The fibers are ceramic fibers and extend circumferentially through 360°.

The metal disc may comprise titanium, titanium aluminide, an alloy of titanium, or any suitable metal, alloy or intermetallic which is capable of being bonded. The hoop strength of the rings of fibers may be varied by varying the volume fraction of the fibers in the rings of fibers, however 35% is normally used, volume fractions above 35% produce reduced transverse strength.

Although the invention has referred to compressor rotors and discs, the invention is equally applicable to gas turbine engine turbine rotors and discs. The invention is also applicable to other rotors or discs, for example steam turbines etc. The invention is particularly suitable for applications where the fiber reinforced metal rotor has a large diameter and is intended to rotate at high speeds, however the invention is also suitable for other circumstances.

I claim:

1. A fiber reinforced metal rotor comprising a hub, a rim and a member extending radially between and interconnecting the hub and the rim, the fiber reinforced metal rotor having an axis of rotation, the fiber reinforced metal rotor having at least two rings of fibers arranged integrally within the fiber reinforced metal rotor, a first ring of fibers being arranged substantially at a first radial distance from the axis of rotation, a second ring of fibers being arranged substantially at a second radial distance from the axis of rotation and the second radial distance is greater than the first radial distance, the first ring of fibers being arranged in the hub of the fiber reinforced metal rotor, wherein each of the first ring of fibers and the second ring of fibers comprises fibers extending circumferentially with respect to the axis of rotation.

2. A fiber reinforced metal rotor as claimed in claim 1 wherein the second ring of fibers is arranged in the rim of the fiber reinforced metal rotor.

3. A fiber reinforced metal rotor as claimed in claim 1 wherein the fiber reinforced metal rotor comprises a metal selected from the group consisting of titanium, titanium aluminide, an alloy of titanium, a bondable metal, a bondable alloy and a bondable intermetallic.

4. A fiber reinforced metal rotor as claimed in claim 1 wherein each of the rings of fibers comprises a fiber selected from the group consisting of silicon carbide, silicon nitride, boron, and alumina.

5. A fiber reinforced metal rotor as claimed in claim 1 wherein the fiber reinforced metal rotor has at least one rotor blade.

6. A fiber reinforced metal rotor as claimed in claim 5 wherein the at least one rotor blade is integral with the fiber reinforced metal rotor.

7. A fiber reinforced metal rotor as claimed in claim 5 wherein the at least one rotor blade has a root arranged to fit in a groove in the rim of the fiber reinforced metal rotor.

8. A fiber reinforced metal rotor as claimed in claim 1 wherein the fiber reinforced metal rotor has an outer radius, the outer radius is at least about 0.5 meters.

9. A fiber reinforced metal rotor as claimed in claim 1 comprising an upstream rotor disc and a downstream rotor disc, at least one of the rotor discs having at least two rings of fibers, each rotor disc having a plurality of rotor blades extending radially therefrom, a casing spaced from the rotor by a clearance, at least one annular spacer extending axially between and secured to the upstream rotor disc and the downstream rotor disc, the at least one annular spacer being fiber reinforced to limit the radial movement thereof and hence the clearance between the rotor and the casing.

10. A rotor as claimed in claim 9 wherein the casing comprises a stator vane assembly surrounding and spaced radially from the annular spacer by a clearance.

11. A rotor as claimed in claim 10 wherein the annular spacer has at least one circumferentially extending rib to define a labyrinth seal with the stator vane assembly.

12. A rotor as claimed in claim 9 wherein the at least one annular spacer is a fiber reinforced metal spacer.

13. A rotor as claimed in claim 12 wherein the fiber reinforced metal spacer comprises a metal selected from the group consisting of titanium, titanium aluminide, an alloy of titanium, a bondable metal, a bondable alloy and a bondable intermetallic.

14. A rotor as claimed in claims 9 wherein all the rotor discs are fiber reinforced metal discs, the fiber reinforced metal disc being reinforced by at least two rings of fibers.

15. A rotor as claimed in claim 9 wherein the reinforcing fibers comprises a fiber selected from the group consisting of silicon carbide, silicon nitride, boron, and alumina.

16. A rotor as claimed in claim 9 wherein there are plurality of annular spacers.

17. A rotor as claimed in claim 9 wherein the fiber reinforcement in the annular spacer is selected to provide sufficient stiffness to the annular spacer to minimize radially outward movement of the annular spacer relative to the upstream rotor disc and downstream rotor disc.

18. A rotor as claimed in claim 17 wherein the fiber reinforcement in the annular spacer is selected to provide sufficient stiffness to the annular spacer to match the radially outward movement of the annular spacer, the upstream rotor disc and the downstream rotor disc.

19. A rotor as claimed in claim 9 wherein the fiber reinforcement in the annular spacer is selected to provide sufficient stiffness to the annular spacer to produce radially inward movement of the annular spacer relative to the upstream rotor disc and downstream rotor disc.

20. A rotor as claimed in claim 9 wherein the rotor is a compressor rotor or a turbine rotor.

21. A rotor as claimed in claim 1 wherein the rotor is a gas turbine rotor.

* * * * *